E. G. & L. KEARSING.
Dental Gold Filling.

No. 203,921.   Patented May 21, 1878.

WITNESSES:
INVENTOR:
E. G. Kearsing
L. Kearsing
BY
ATTORNEYS.

UNITED STATES PATENT OFFICE.

EDWARD G. KEARSING AND LEONZO KEARSING, OF SPRING VALLEY, N. Y.

IMPROVEMENT IN DENTAL-GOLD FILLINGS.

Specification forming part of Letters Patent No. 203,921, dated May 21, 1878; application filed December 19, 1877.

*To all whom it may concern:*

Be it known that we, EDWARD G. KEARSING and LEONZO KEARSING, of Spring Valley, in the county of Rockland and State of New York, have invented a new and useful Improvement in Plastic-Surfaced Gold Blocks for Dental Purposes, of which the following is a specification:

The object of this invention is to furnish dental gold so prepared that it may be used in heavier masses than is practicable with gold prepared in the ordinary way, so as to save time and labor to the operator by shortening the tedious operation of filling teeth.

The invention will first be described in connection with the process of preparing the article, and then pointed out in the claim.

Figure 1:
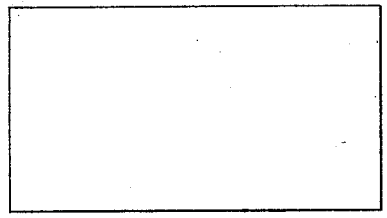
Figure 2:
Figure 3:
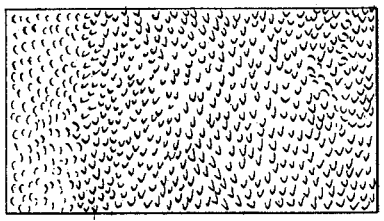
Figure 4:
Figure 5:
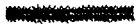

Figure 1 of the drawings represents a ribbon of rolled gold-foil; Fig. 2, cup-shaped fragments of gold; Fig. 3, the fragments welded on the plain gold; Fig. 4, a block cut from the same, and Fig. 5 an enlarged block with plastic surface.

In preparing the plastic-surfaced gold we take ordinary gold-foil and place it upon a sieve made of very fine platina wire or other suitable material. We then pass a brush over the gold-foil with a slight pressure, which forces the gold through the meshes of the sieve in small cup-shaped fragments. We next take a bar of gold and roll it out until it is thin enough to be sufficiently pliable. Heavy-beaten gold may be used; but rolled gold is preferable. Both sides of the gold ribbon are then covered with the cup-shaped gold fragments and subjected, in a muffle, to heat just below the melting-point, which causes it to shrink, and thoroughly incorporates the cup-shaped fragments with, and welds them to, the gold ribbon, forming blocks of gold with plastic surfaces. The block of gold is now ready to be cut up into pieces of suitable size for use.

The gold thus prepared, having a plastic surface, will readily take the impression of the instrument, and will adhere to it, so that it can be carried to the cavity to be filled without the use of tweezers, thus saving the time required for changing instruments each time a piece of gold is introduced into the cavity to be filled.

Gold condensed by beating or rolling is the best of all articles for filling teeth, but cannot be packed in the minute inequalities of the cavity. We obviate this difficulty by covering the surface with a spongy mass of golden particles, heated, so as to weld them fast.

We are aware that sheets of gold-foil have been wound around strips of gold; but this forms a continuous surface, while one part of the cylinder thus formed will draw and curl up, loosening the part already condensed. This winding of gold-foil around strips of heavy gold is for the purpose of strengthening the outside windings, and not adapted to overcome the difficulties specified.

What we claim as new is—

A ribbon of gold having fine pieces of gold sifted on the flat surface and welded fast by heat, as and for the purpose specified.

EDWARD G. KEARSING.
   LEONZO KEARSING.

Witnesses:
  CHAS. E. FARRINGTON,
  PETER VANDERBILT.